United States Patent [19]
Merrick et al.

[11] Patent Number: 5,839,793
[45] Date of Patent: Nov. 24, 1998

[54] CHILD SEAT HARNESS CLIP

[75] Inventors: David D. Merrick, Indianapolis; Peter E. Miller, Noblesville; Gerald W. Thompson, Fishers, all of Ind.

[73] Assignee: Indiana Mills & Manufacturing, Inc., Westfield, Ind.

[21] Appl. No.: 623,695

[22] Filed: Apr. 15, 1996

[51] Int. Cl.⁶ .................................................. A47C 31/00
[52] U.S. Cl. .......................... 297/484; 297/482; 24/615; 24/625
[58] Field of Search .................................... 297/484, 482, 297/485, 486, 487; 24/615, 625

[56] References Cited

U.S. PATENT DOCUMENTS

| | | | |
|---|---|---|---|
| 2,477,354 | 7/1949 | Teolis | 24/625 X |
| 4,414,714 | 11/1983 | Capolupo | 24/615 X |
| 4,637,622 | 1/1987 | Burgard | 297/485 X |
| 5,031,962 | 7/1991 | Lee . | |
| 5,084,946 | 2/1992 | Lee . | |
| 5,148,582 | 9/1992 | Dennis, Jr. | 24/615 X |
| 5,286,090 | 2/1994 | Templin et al. . | |
| 5,380,067 | 1/1995 | Turvill et al. | 297/484 |
| 5,398,997 | 3/1995 | McFalls | 297/484 X |

*Primary Examiner*—Laurie K. Cranmer
*Attorney, Agent, or Firm*—Woodward, Emhardt, Naughton Moriarty & McNett

[57] ABSTRACT

A child restraint system for use in a vehicle. The restraint includes a harness having a pair of webs extending over and adjacent the child's chest and through a pair of soft socks adjustable along the length of each web. The bottom of each sock includes a rigid base having a slot through which the web extends limiting twisting movement of each web. A quick disconnect connector is pivotally connected to each base allowing the webs extending through the socks to conformingly fit against the child while lateral movement of the webs is limited.

13 Claims, 6 Drawing Sheets

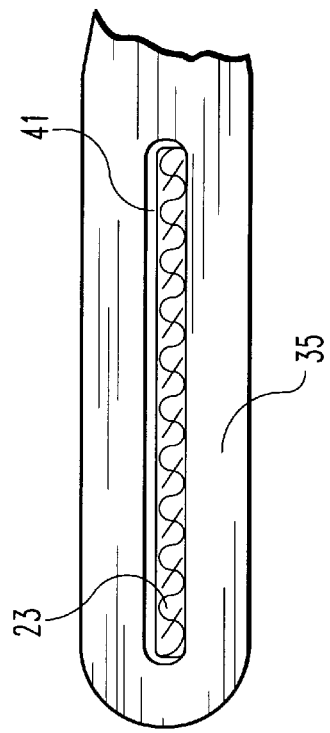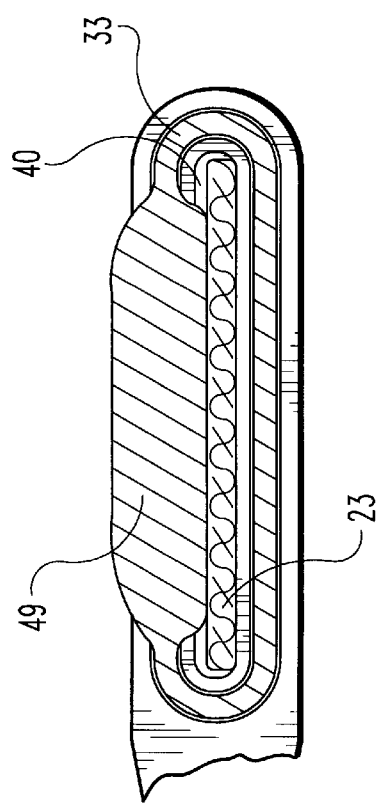

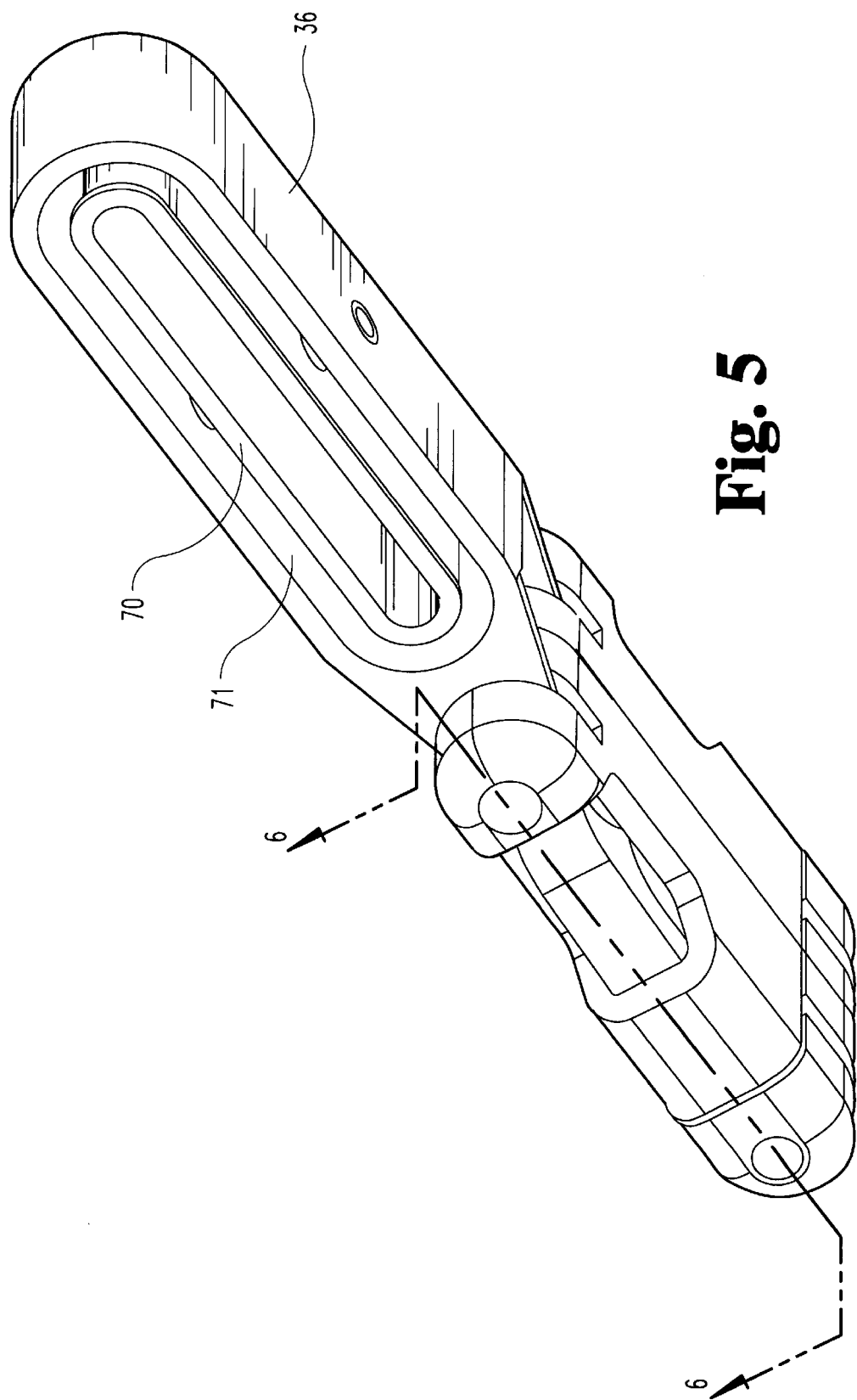

5,839,793

CHILD SEAT HARNESS CLIP

BACKGROUND OF THE INVENTION

1. Field of the Invention

This invention is in the field of vehicle child seat integrated into a vehicle passenger seat or separate therefrom and more specifically, a child seat having a connecting device to removably secure the seat harness webs together.

2. Description of the Prior Art

A child restraint system may be integrated or built into a vehicle passenger seat or may be included within a child seat restable upon the vehicle seat. A variety of different types of harness systems are available such as disclosed in the commonly owned U.S. Pat. Nos. 5,286,090 and 5,031,962. Typically, the restraint system includes a pair of webs extendable downwardly over the shoulders and against the chest of the child to a pair of tongues or a single tongue, in turn, lockingly engaged with a buckle secured to the seat. In order to position the webs together across the child's chest, quick disconnect connectors are utilized such as shown in the commonly owned U.S. Pat. No. 5,084,946.

In order to increase the comfort of the child, soft tubes or socks are available through which the webs are extended. The socks may be adjustably positioned along the length of each web and have an outer soft surface positioned between each web edge and the child's neck. Such socks provide an attractive appearance for the harness and the seat combination.

Instead of requiring separate positioning of both the web socks as well as the quick disconnect connectors securing the webs together, it is desirable to provide a combined multi-sock and web connector thereby reducing the number of steps required to adjust the harness to the particular child. Likewise, such a combination is desirable to more securely hold the socks and connector at the desired location along the length of the webs while at the same time insuring that at least a portion of each web is parallel to each other thereby positioning the webs accurately across the child's chest. Disclosed herein is such a combined sock and connector combination.

SUMMARY OF THE INVENTION

A device for restraining a child in a vehicle comprising a seat having a seat support and back support against which the child may rest. A harness is movably mounted to the seat and includes a pair of webs extendable over the shoulders and the chest of the child. The webs extend through a first anti web twist guide and a second anti web twist guide. A connector movably mounted to the anti web twist guides keep the webs apart.

It is an object of the present invention to provide a new and improved child vehicle restraint system.

A further object of the present invention is to provide a combined web guide and connector to limit lateral movement of one child restraint web relative to another child restraint web.

Related objects and advantages of the present invention will be apparent from the following description.

BRIEF DESCRIPTION OF THE DRAWINGS

FIG. 3 is a cross-sectional view taken along line 3—3 of FIG. 2 and viewed in the direction of the arrows.

FIG. 4 is a bottom view of one of the guides looking in the direction of arrows 4—4 of FIG. 2.

FIG. 5 is a top perspective view of the connector and guide base.

DESCRIPTION OF THE PREFERRED EMBODIMENT

Figure 1:
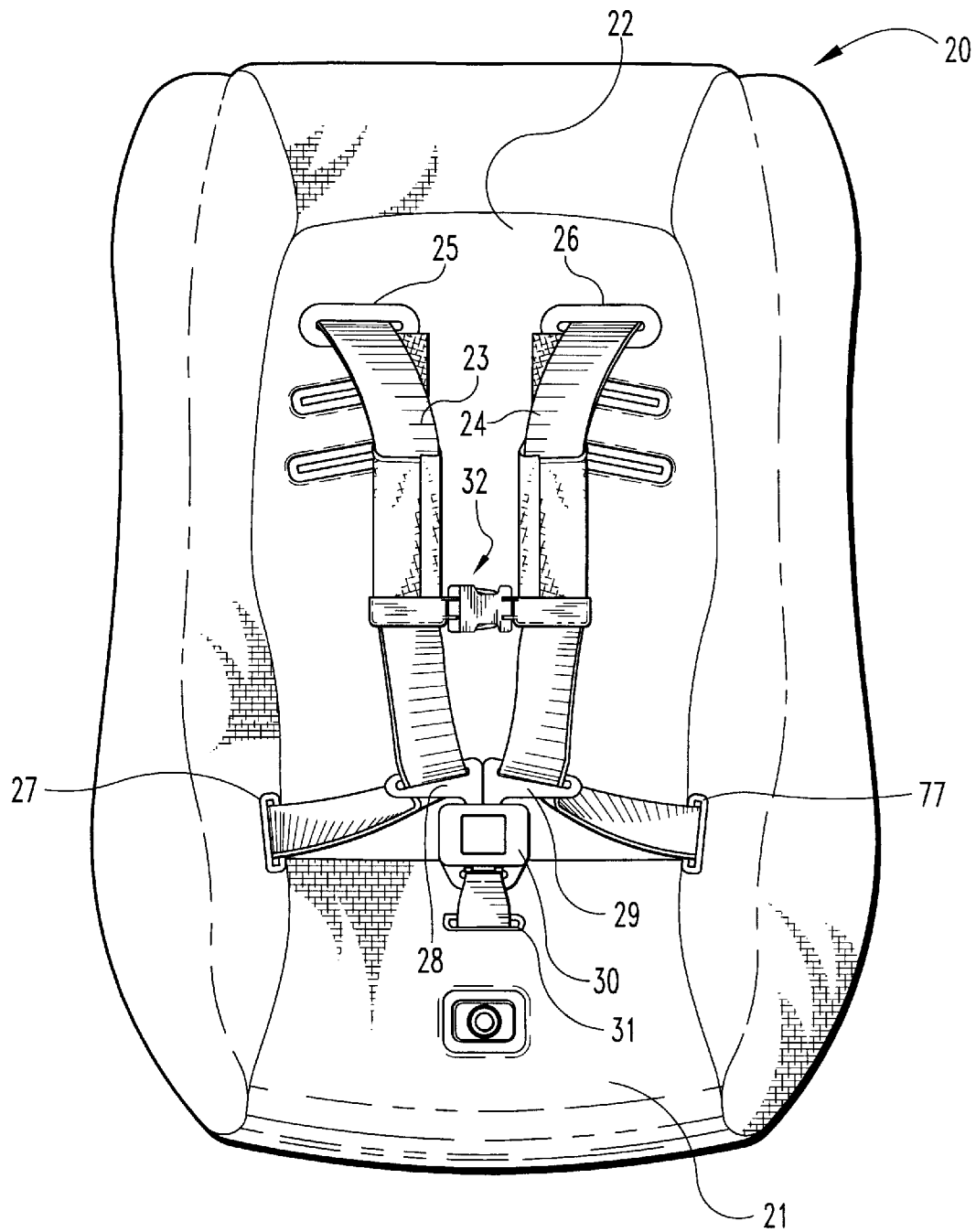
FIG. 1 is a front view of a child seat having a pair of restraint webs with the guide and connector combination incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
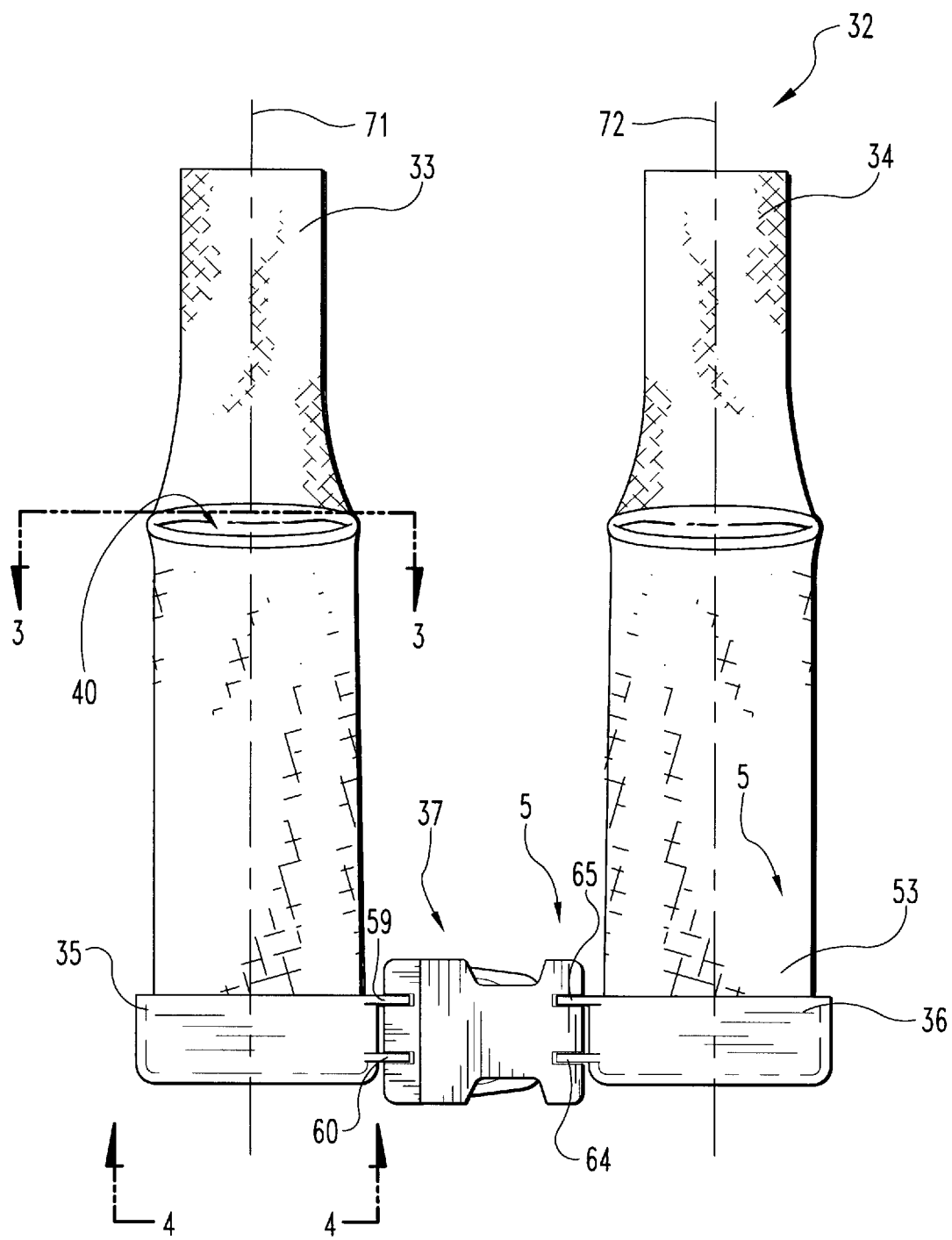
FIG. 2 is an enlarged front view of the guide connector combination.

Referring now more particularly to FIG. 1, there is shown the preferred embodiment of seat 20 incorporating the guide connector combination. Seat 20 includes a bottom portion 21 and back portion 22 upon and against which the child rests. A pair of webs 23 and 24 extend through slots 25 and 26 provided in back portion 22 and have first opposite ends secured behind or beneath the seat. Likewise, the second opposite ends of webs 23 and 24 extend through slots 27 and 28 of the seat and are fixedly secured thereto. A pair of seat belt buckle tongues 77 and 29 are slidably mounted respectively to each web 23 and 24 and are lockingly engageable with a seat belt buckle 30 attached to a web extending via slot 31 through the bottom portion 21 with the opposite end of the web being suitably mounted. Such a seat described is well known in the art and may be, for example, the seat disclosed in the commonly owned U.S. Pat. No. 5,380,066, herewith incorporated by reference. The guide connector combination 32 is slidably mounted to webs 23 and 24 and is positionable along the length of the webs between slots 25–26 and tongues 28–29. The combination has a pair of identical socks 33 and 34 (FIG. 2) each having a fabric and flexible main body with respectively a rigid plastic bottom base 35 and 36 releasably connected together by means of a quick disconnect connector 37.

Figure 7:
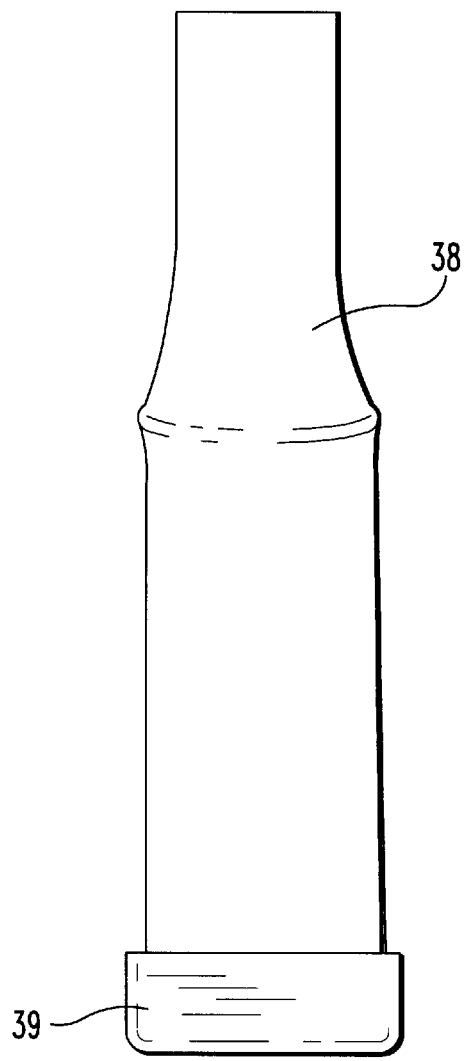
FIG. 7 is a front view of a guide known in the prior art.

A prior art sock 38 is shown in FIG. 7 and includes a flexible and soft main body fixedly mounted to and extending upwardly from a rigid plastic base 39. Each sock 33, 34 and 38 define a tubular passage through which the web extends. For example, sock 33 includes tubular passage 40 (FIG. 3) slidably receiving web 23. One side 49 (FIG. 3) of the main body of sock 33 is enlarged and projects into passage 40 against web 23 thereby holding the sock to the web until sufficient force is applied between the sock and the web when adjusting the sock along the length of the web. Likewise, each base 35, 36 and 39 includes a slot through which the web extends. For example, base 35 (FIG. 4) has a slot 41 through which web 23 extends with the slot sized approximately the same dimensions as the web preventing the web from twisting. Each base 35, 36 and 39 includes a continuous oval shaped slot into which the bottom portion of the fabric sock main body extends and is secured thereto. For example, base 36 includes oval shaped slot 71 (FIG. 5) into which the bottom portion 53 (FIG. 2) of sock 34 extends being secured thereto by suitable means such as adhesive and/or fastening devices. The pair of slots 41 provided in the base wall of each base 35 and 36 prevent the webs from twisting. Each base includes an oval shaped exterior side wall and an oval shaped interior wall 70 which extend upwardly from the base bottom wall. The space between the interior wall and exterior wall defines the oval shape recess 71 into which the bottom end of the fabric portion of the sock extends and is fixed. Slot 41 is positioned inwardly of interior wall 70. Thus, each web 23 and 24 is located inwardly of each interior wall 70.

Quick disconnect connector 37 has a male member 42 (FIG. 6) extendable into and releasably lockable with a female member 43. Connector 37 is identical to the connector disclosed in U.S. Pat. No. 5,084,946, which is herewith incorporated by reference, except for the outer end portions of male member 42 and female member 43. Thus, male member 42 includes a pair of arms 44 and 45 cantileverly mounted to the main body 46 of the male member. The inwardly turned distal ends 47 and 48 are contactable together as the arms are moved inwardly to the unlocked position. The arms are plastic and therefore may be moved inward from the normal position shown in FIG. 6. The distal ends of the arms limit the amount of inward movement of the arms; however, the arms do not contact post 49 positioned therebetween. As a result, the male member may be quickly and easily withdrawn from the female member without the distal ends of the arms contacting the post. The outwardly facing surfaces of the distal ends 47 and 48 are radiused and contact the interior surface of side walls 50 and 51 of female member 43 causing the arms to pivot inwardly as the male member is inserted into the female member. As disclosed in U.S. Pat. No. 5,084,946, arms 44 and 45 each include a recess 52 and 53 for receiving the slotted side walls 51 and 50 of female member 43 when the male member is inserted into the female member. Side walls 50 and 51 have respectively slanted surfaces 54 and 55 arranged at an acute angle relative to the longitudinal axis 58 extending through the connector.

Figure 6:
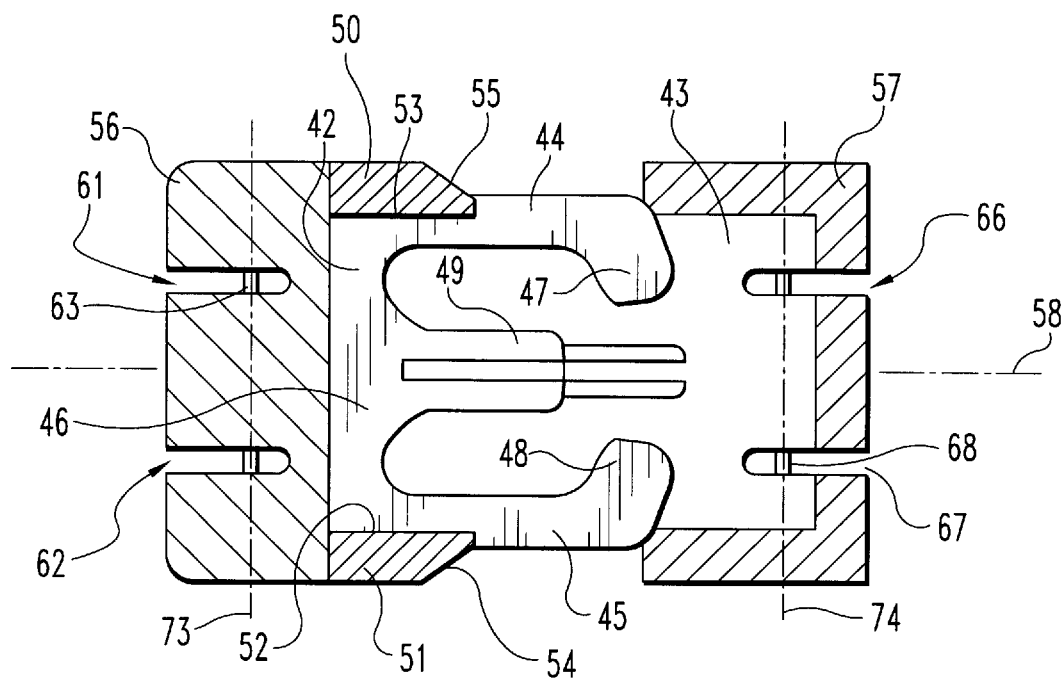
FIG. 6 is a reduced cross-sectional view taken along lines 6—6 of FIG. 5 and viewed in the direction of the arrows.

The connector illustrated in FIG. 6 is distinguishable from the connector disclosed in U.S. Pat. No. 5,084,946 in that the outer end portions 56 and 57 respectively of male member 42 and female member 43 are pivotally or hingedly mounted to guide base 35 and 36 allowing each sock 33 and 34 to articulate relative to connector 37. Each sock has a longitudinal axis extending parallel to the pivot axis of the male and female members. That is, longitudinal axis 71 (FIG. 2) of guide 33 and longitudinal axis 72 of guide 34 are parallel to pivot axis 73 and pivot axis 74 (FIG. 6) extending centrally through respectively pivot pins 63 and 68 (FIG. 6). Base 35 (FIG. 2) includes a pair of spaced apart flanges 59 and 60 integrally attached thereto having outer ends which project into a pair of slots 61 and 62 (FIG. 6) of male member 42 being secured therein by pin 63. Likewise, sock base 36 includes a pair of spaced apart flanges 64 and 65 integrally attached thereto having outer distal ends positioned within slots 66 and 67 of female member 43 being secured thereto by pin 68. Thus, male member 42 is pivotally or hingedly mounted to the distal ends of flanges 59 and 60 whereas female member 43 is pivotally or hingedly mounted to the outer distal ends of flanges 64 and 65.

The guide sock combination 32 provides a pair of anti twist guides through which the pair of webs extend. The male and female members of the connector form a pair of connectors movably mounted to the base of each sock and when releasably mated together keep the webs 23 and 24 apart. Likewise, the tubular sock passages extend a fixed distance from the sock base or from the connectors thereby limiting lateral movement of one web relative to the other web so long as the male and female members are connected together. With the fabric portion of socks 33 and 34 positioned at approximately neck level, the webs will extend a fixed distance apart across the chest of the child with the webs then exiting the bottom of each sock base and extending to the respective tongues 28 and 29. The pivotal or hinge connection between the connector 37 and socks allow the webs to conform to the shape of the child as the child moves. Further, passages 40 and 41 are parallel when connector male member 42 is locked to connector female member 43 insuring that the portion of webs 23 and 24 which extend through the socks across the child are parallel.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A connector for holding a first web and second web together comprising:

a first guide for receiving a first web;

a second guide for receiving a second web;

a first connector pivotally connected to said first guide;

a second connector pivotally connected to said second guide and releasably lockable with said first connector to limit relative motion between said first guide and said second guide;

said first guide and said second guide each include a main body with a side wall and a bottom wall joined together, said bottom wall of each guide has a slot through which said first web and said second web extend respectively through said first guide and said second guide, said slot sized to limit twisting of said first web and said second web;

each main body includes a hinge connecting said first guide and said second guide respectively thereto;

each main body also includes an interior wall fixed to said bottom wall and positioned inwardly of said side wall forming an upwardly opening cavity; and a first web sock and a second web sock to slidably receive respectively said first web and said second web which extend into said upwardly opening cavity of each main body being fixedly mounted thereto.

2. The connector of claim 1 wherein:

each interior wall is spaced outwardly of and surrounds each slot keeping said first web and second web located inwardly of each interior wall.

3. The connector of claim 2 wherein:

each sock has a longitudinal axis, each hinge has a pivot axis about which said first connector and said second connector pivot with said pivot axis parallel to said longitudinal axis when said first connector is locked to said second connector.

4. A connector for holding a first web and a second web together comprising:

a first guide and a second guide for receiving respectively a first web and a second web; and a first connector and a second connector respectively connected to said first guide and to said second guide with said first connector and said second connector releasably lockable together to limit relative motion between said first guide and said second guide, said first guide and said second guide each include a main body with a side wall and a bottom wall joined together, said bottom wall of each guide has a slot through which said first web and said second web extend respectively through said first guide and said second guide, said slot sized to limit twisting of said first web and said second web;

each main body includes an interior wall fixed to said bottom wall and spaced apart from said side wall forming an upwardly opening cavity; and a first web sock and a second web sock to slidably receive respectively said first web and said second web and being fixedly mounted to said first guide and said second guide and having bottom end portions extending into said upwardly opening cavity of each main body.

5. The connector of claim 4 wherein:

said interior wall is spaced outwardly and surrounds said slot keeping said first web and second web located inwardly of each interior wall.

6. A child seat comprising:

a seat with a bottom portion and a back portion upon and against which a child may rest;

a pair of belts mounted to said seat and extending downwardly from said back portion of said seat toward said bottom portion across the child;

a pair of socks through which said belts extend, said socks positionable along said belts; and, a connector with a pair of releasable lockable connector portions mounted to said socks to limit movement of said socks and belts relative to the child.

7. The child seat of claim 6 wherein:

said connector portions are articulatably connected to said socks.

8. The child seat of claim 7 wherein:

said socks each include a main body and a base secured together with said base of said socks pivotally connected to said connector portions.

9. The child seat of claim 8 wherein:

said connector portions include a male member and a female member releasable matable together and said base of said socks each include a slot through which said belts extend, each slot sized relative to each belt to limit twisting of each belt.

10. The child seat of claim 9 wherein:

said male member includes a pair of cantileverly mounted flexible arms movable from a normal spaced apart position whereat said arms lockingly engage said female member to an inwardly located release position whereat said arms converge, are unlocked and are movable outward apart from said female member.

11. The child seat of claim 6 wherein:

said socks include passages through which said belts extend, said passages are parallel when said connector portions are locked together keeping said belts within said socks parallel.

12. A child seat comprising:

a seat with a bottom portion and a back portion upon and against which a child may rest;

a pair of belts mounted to said seat and extending downwardly from said back portion of said seat toward said bottom portion across the child;

a pair of socks through which said belts extend, said socks positionable along said belts; and, a connector with a pair of releasable lockable connector portions mounted to said socks to limit movement of said socks and belts relative to the child, said connector portions being articulatably connected to said socks;

said socks each include a main body and a base secured together with said base of said socks pivotally connected to said connector portions;

said connector portions include a male member and a female member releasably matable together and said base of said socks each include a slot through which said belts extend, each slot sized relative to each belt to limit twisting of each belt; and each base includes a side wall and a bottom wall joined together, said bottom wall has said slot located thereon, each base wall further includes an interior wall located inwardly of said side wall but outwardly of said slot defining a recess into which said main body extends and is fixed.

13. An apparatus comprising:

a first web extending in a first direction;

a second web extending in a second direction;

a first guide having a first slot slidably receiving said first web in said first direction and sized to limit twisting thereof, said first guide having a first pivot axis extending in said first direction;

a second guide having a second slot slidably receiving said second web in said second direction and sized to limit twisting thereof, said second guide having a second pivot axis extending in said second direction;

a first connector having a first longitudinal axis, said first connector being pivotally connected to said first guide about said first pivot axis substantially perpendicular to said first longitudinal axis; and, a second connector having a second longitudinal axis, said second connector being pivotally connected to said second guide about said second pivot axis substantially perpendicular to said second longitudinal axis and releasably lockable with said first connector to limit relative motion between said first guide and said second guide along said first longitudinal axis and said second longitudinal axis while allowing limited motion between said first web relative to said first guide and said second web relative to said second guide in said first direction and said second direction.

\* \* \* \* \*

UNITED STATES PATENT AND TRADEMARK OFFICE
CERTIFICATE OF CORRECTION

PATENT NO : 5,839,793
DATED : November 24, 1998
INVENTOR(S): David D. Merrick, Peter E. Miller and Gerald W. Thompson It is certified that error appears in the above-identified patent and that said Letters Patent is hereby corrected as shown below:

In column 2, line 30 delete the number "28" and insert the number --77--.

In column 2, line 31 delete the number "77" and insert the number --28--.

Signed and Sealed this

Eighteenth Day of May, 1999

*Attest:*

Q. TODD DICKINSON

*Attesting Officer*     Acting Commissioner of Patents and Trademarks